(12) United States Patent
Bertelli

(10) Patent No.: US 8,651,659 B2
(45) Date of Patent: Feb. 18, 2014

(54) BAR FOR SPECTACLES AND SPECTACLES COMPRISING THIS BAR

(75) Inventor: Patrizio Bertelli, Lugano (CH)

(73) Assignee: Prada S.A., Luxembourg (LU)

( * ) Notice: Subject to any disclaimer, the term of this patent is extended or adjusted under 35 U.S.C. 154(b) by 116 days.

(21) Appl. No.: 13/496,924

(22) PCT Filed: Oct. 15, 2010

(86) PCT No.: PCT/IB2010/054676
§ 371 (c)(1),
(2), (4) Date: May 21, 2012

(87) PCT Pub. No.: WO2011/048533
PCT Pub. Date: Apr. 28, 2011

(65) Prior Publication Data
US 2012/0218505 A1 Aug. 30, 2012

(30) Foreign Application Priority Data
Oct. 23, 2009 (IT) .............................. MI2009A1846

(51) Int. Cl.
*G02C 5/14* (2006.01)
(52) U.S. Cl.
USPC ................ 351/119; 351/51; 351/52; 351/118
(58) Field of Classification Search
USPC ............. 351/119, 118, 51, 52, 113, 114, 111; 2/12, 13
See application file for complete search history.

(56) References Cited

U.S. PATENT DOCUMENTS

| | | | | |
|---|---|---|---|---|
| 3,052,160 A * | 9/1962 | Giuseppe | ......................... | 351/83 |
| 4,037,946 A * | 7/1977 | Blumenthal | .................. | 351/114 |
| 4,781,450 A * | 11/1988 | Danloup et al. | .............. | 351/114 |
| 4,904,075 A * | 2/1990 | Blumenthal | .................. | 351/114 |
| 5,258,784 A * | 11/1993 | Baines | ........................... | 351/41 |
| 5,652,635 A | 7/1997 | Kirschner | | |
| 6,652,093 B1 | 11/2003 | Lamy | | |
| 8,444,265 B2 * | 5/2013 | Yee et al. | ...................... | 351/113 |

FOREIGN PATENT DOCUMENTS

| | | |
|---|---|---|
| DE | 515774 C | 1/1931 |
| DE | 3521296 A1 | 12/1986 |
| FR | 2547430 A3 | 12/1984 |

\* cited by examiner

*Primary Examiner* — Hung Dang
(74) *Attorney, Agent, or Firm* — Lucas & Mercanti, LLP

(57) ABSTRACT

Bar for spectacles, which comprises an elongated member (1) having a rear end (1*a*) suitable for being arranged on the ear of a user and a front end (1*b*) suitable for being connected to the front portion of spectacles, wherein the front end (1*b*) of the elongated member (1) is prolonged by one or more additional members (2, 3, 4) by means of at least one longitudinal pin (5) which is inserted in a longitudinal hole made in the front end (1*b*) of the elongated member (1) and in the additional members (2, 3, 4). The present invention also relates to spectacles comprising said bar.

13 Claims, 2 Drawing Sheets

BAR FOR SPECTACLES AND SPECTACLES COMPRISING THIS BAR

CROSS-REFERENCE TO RELATED APPLICATIONS

This application is a 371 of PCT/IB2010/054676, filed Oct. 15, 2010, which claims the benefit of Italian Patent Application No. MI2009A001846, filed Oct. 23, 2009, the contents of each of which are incorporated herein by reference.

FIELD OF THE INVENTION

The present invention relates to a bar for spectacles, as well as spectacles comprising this bar.

BACKGROUND OF THE INVENTION

Known bars for spectacles comprise an elongated member having a rear end suitable for being arranged on the ear of a user and a front end suitable for being connected to the front portion of spectacles. The outer side of the front end is generally provided with graphic symbols, as for example the trademark of the manufacturer, which are applied in the factory in a permanent manner. For customizing said spectacles, the user or the retailer can glue symbols on one or both bars, however the result of this customization is inevitably not perfect as it was made in the factory, especially with respect to the aesthetics, the position and the mechanical resistance of the symbols applied.

U.S. Pat. No. 5,652,635, DE 3521296, DE 515774 and U.S. Pat. No. 6,652,093 disclose a bar for spectacles provided with a longitudinal pin which is inserted in a longitudinal hole made in one or more additional members.

In the bar for spectacles of DE 3521296 two screws are further inserted in transversal holes made in a front additional member, in the longitudinal pin and in a longitudinal tongue provided with a hinge member. The additional members are used to lengthen the bar and make it flexible, however with the consequence of decreasing its solidity.

SUMMARY OF THE INVENTION

It is therefore an object of the present invention to provide spectacles free from said disadvantages, namely spectacles which can be customized in an easy manner and with a perfect result, thereby keeping at the same time a high sturdiness. Said object is achieved with a bar for spectacles and spectacles, whose main features are disclosed in claims 1 and 12, respectively, while other features are disclosed in the remaining claims.

Thanks to the particular mechanical system comprising a longitudinal tongue combined with a longitudinal pin inserted in one or more additional members, preferably three additional members, the bar according to the present invention allows an easy, quick and aesthetically pleasant customization of the spectacles comprising this bar, thereby modifying the color, the shape and/or the sizes of one or more additional members and/or applying already in the factory one or more graphic symbols on one or more additional members.

According to a particular aspect of the invention, two or more additional members have substantially the same shape and the same sizes, so as to mutually exchange additional members provided with different symbols and thus to multiply the possibilities of customization.

According to another particular aspect of the invention, the additional members and the front end of the elongated member are provided with vertical protrusions and corresponding vertical seats, preferably arranged on the inner side of the bar, for carrying out a mechanical coupling and preventing the passage of light between these members, so as to simultaneously improve the sturdiness and the aesthetics of the bar.

According to a further particular aspect of the invention, a longitudinal tongue is arranged in a longitudinal seat made preferably on the inner side of the bar and one or more transversal members are inserted in transversal holes made in the longitudinal pin, in the longitudinal tongue and/or in other members of the bar, so as to further improve the sturdiness of the bar. Said transversal members are preferably screws screwed in the longitudinal pin, so as to assemble and disassemble the bar with the same easiness.

A hinge member is integral with the longitudinal pin, so that the hinge connecting the bar to the front portion of the spectacles also connects all the members of the bar, thereby still more improving the sturdiness of the same.

BRIEF DESCRIPTION OF THE DRAWINGS

Further advantages and features of the bar according to the present invention will become clear to those skilled in the art from the following detailed and non-limiting description of an embodiment thereof with reference to the attached drawings, wherein.

DETAILED DESCRIPTION OF THE INVENTION

Figure 1:
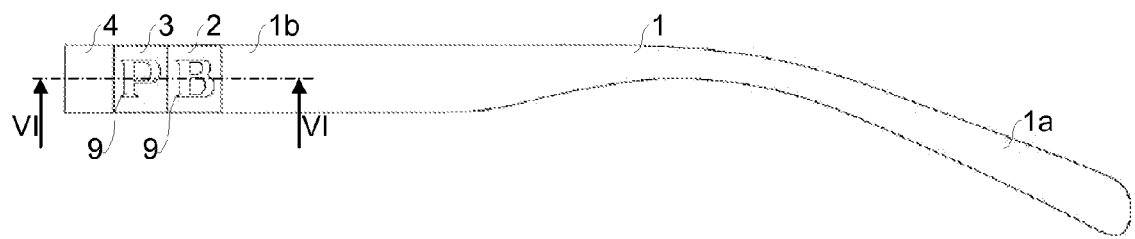
FIG. 1 shows an outer side view of the bar.
Figure 2:
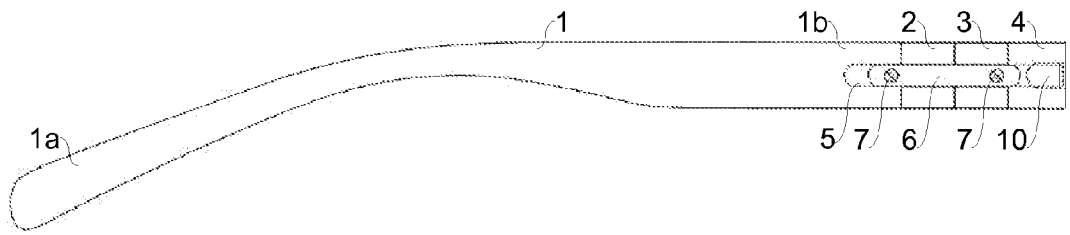
FIG. 2 shows an inner side view of the bar of FIG. 1.
Figure 3:
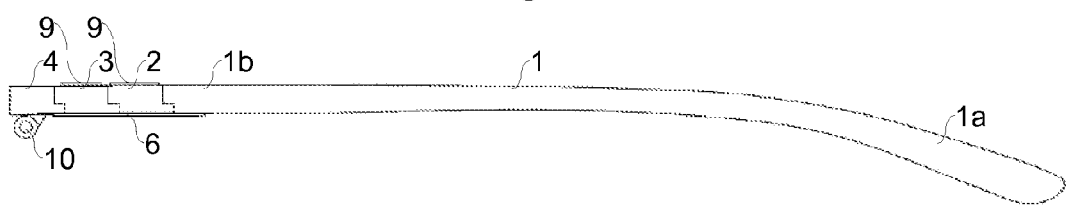
FIG. 3 shows a bottom view of the bar of FIG. 1.
Figure 4:
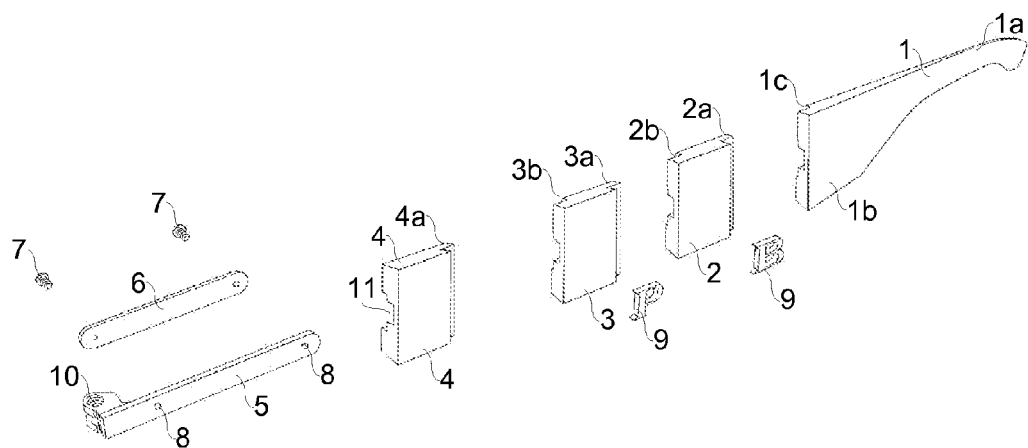
FIG. 4 shows a perspective exploded view of the bar of FIG. 1.
Figure 5:
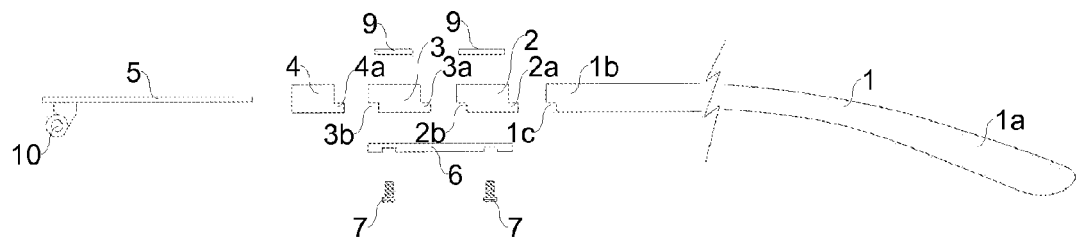
FIG. 5 shows a exploded bottom view of the bar of FIG. 1.
Figure 6:
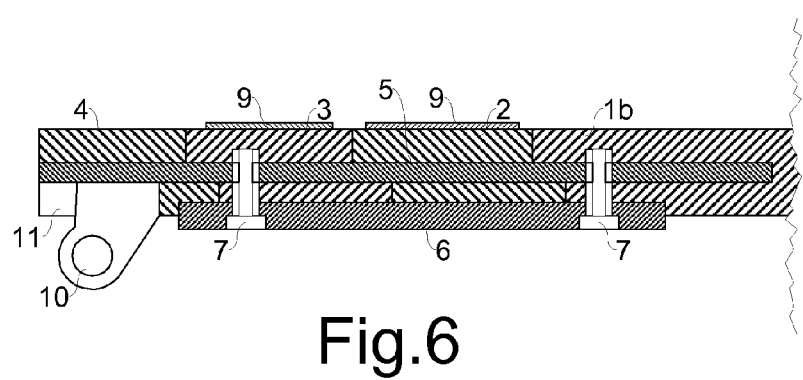
FIG. 6 shows a partial and enlarged view of section VI-VI of FIG. 1.

Referring to FIGS. 1 to 6, it is seen that the bar according to the present invention comprises in a known way an elongated member 1 having a rear end 1a, for example curved downward, suitable for being arranged on the ear of a user and a front end 1b, for example rectilinear, suitable for being connected to the front portion of spectacles, for example by means of a hinge.

Front end 1b of elongated member 1 is prolonged by one or more additional members, preferably a rear additional member 2, an intermediate additional member 3 and a front additional member 4, by means of at least one longitudinal pin 5 (shown with a broken line in FIG. 2) which is inserted in a longitudinal hole made in front end 1b of elongated member 1 and in additional members 2, 3, 4. Two or more additional members, in particular rear additional member 2 and intermediate additional member 3, have substantially the same shape and the same sizes. The outer perimetric profile of an end of one or more additional members 2, 3, 4 is substantially the same, in particular substantially rectangular, as the outer perimetric profile of front end 1b of elongated member 1 and/or of the adjacent ends, respectively, of adjacent additional members 3, 4. The outer profile of longitudinal pin 5 and the inner profile of the longitudinal hole of elongated member 1 and of additional members 2, 3, 4 are substantially rectangular for preventing a mutual rotation between these members. The tip of longitudinal pin 5 and the inner end of longitudinal hole of elongated member 1 are rounded.

An end of one or more additional members 2, 3, 4 is provided with a vertical protrusion 2a, 3a, 4a suitable for being inserted in a corresponding vertical seat 1c, 2b, 3b made in front end 1b of elongated member 1 and/or in the adjacent end of adjacent additional members 2, 3, respectively. Vertical protrusions 2a, 3a, 4a and vertical seats 1c, 2b, 3b preferably have a substantially parallelepiped shape and are in particular arranged on the inner side of the bar.

A longitudinal tongue 6 is arranged in a longitudinal seat made on a side of front end 1b of elongated member 1 and of one or more additional members 2, 3, 4, in particular on the same side of vertical protrusions 2a, 3a, 4a and of vertical seats 1c, 2b, 3b, namely the inner side of the bar. One or more transversal members 7 are inserted in transversal holes made in the longitudinal pin 5, in the longitudinal tongue 6, in front end 1b of elongated member 1 and/or in one or more additional members 2, 3, 4, in particular in intermediate additional member 3. Transversal members 7 are preferably screws screwed in transversal holes 8 of longitudinal pin 5, which are threaded.

One or more graphic symbols 9, in particular an alphanumeric symbol, are applied on a side of front end 1b of elongated member 1 and/or or one or more additional members 2, 3, 4, in particular on the side opposite to vertical protrusions 2a, 3a, 4a and to vertical seats 1c, 2b, 4, namely on the outer side of the bar, i.e. the side opposite to the side facing longitudinal tongue 6.

A hinge member 10 is integral with longitudinal pin 5 and protrudes through a longitudinal notch 11 made in the additional member opposite to elongated member 1, namely in front additional member 4. Hinge member 10 can be coupled, for example by means of a pin, with a complementary hinge member fixed to the front portion of the spectacles.

In the present embodiment additional members 2, 3, 4 have a substantially parallelepiped shape, but in other embodiments they may have substantially prismatic, frustopyramidal, cylindrical or frustoconical shapes. In the present disclosure the term spectacles obviously refers to prescription eyeglasses, sunglasses and the like.

Possible modifications and/or additions may be made by those skilled in the art to the hereinabove disclosed and illustrated embodiment while remaining within the scope of the following claims.

The invention claimed is:

1. Bar for spectacles, which comprises an elongated member having a rear end suitable for being arranged on the ear of a user and a front end suitable for being connected to the front portion of spectacles, the front end of the elongated member being prolonged by one or more additional members by means of at least one longitudinal pin which is inserted in a longitudinal hole made in the front end of the elongated member and in the additional members, wherein one or more transversal members are inserted in transversal holes made in one or more additional members, in the longitudinal pin and in a longitudinal tongue arranged on a side of the additional members, wherein one or more transversal members are inserted in transversal holes made in the front end of the elongated member, in the longitudinal pin and in the longitudinal tongue, wherein a hinge member is integral with the longitudinal pin, one or more graphic symbols, in particular an alphanumeric symbol, being applied on a side of one or more additional members, which side is opposite to the side facing the longitudinal tongue.

2. Bar for spectacles according to claim 1, wherein said additional members comprise a rear additional member, an intermediate additional member and a front additional member.

3. Bar for spectacles according to claim 1, wherein two or more additional members have substantially the same shape and the same sizes.

4. Bar for spectacles according to claim 1, wherein the outer perimetric profile of an end of one or more additional members is substantially the same as the outer perimetric profile of the front end of the elongated member and/or of the adjacent ends of the adjacent additional members, respectively.

5. Bar for spectacles according to claim 1, wherein an end of one or more additional members is provided with a vertical protrusion suitable for being inserted into a corresponding vertical seat made in the front end of the elongated member and/or in the adjacent end of the adjacent additional members, respectively.

6. Bar for spectacles according to claim 5, wherein the vertical protrusions and the vertical seats have a substantially parallelepiped shape.

7. Bar for spectacles according to claim 5, wherein the graphic symbols are applied on the side opposite to the vertical protrusions and to the vertical seats.

8. Bar for spectacles according to claim 1, wherein the longitudinal tongue is arranged in a longitudinal seat made on a side of the front end of the elongated member and of one or more additional members, in particular on the same side of the vertical protrusions and of the vertical seats.

9. Bar for spectacles according to claim 1, wherein one or more transversal members are inserted in transversal holes made in the longitudinal pin, in the longitudinal tongue, in the front end of the elongated member and in an additional member, in particular in the intermediate additional member.

10. Bar for spectacles according to claim 1, wherein the transversal members are screws screwed in the transversal holes of the longitudinal pin.

11. Bar for spectacles according to claim 1, wherein the hinge member protrudes through a longitudinal notch made in the additional member opposite to the elongated member.

12. Spectacles, wherein they comprise at least one front portion connected to a bar according to claim 1.

13. Spectacles according to claim 12, wherein the hinge member of the bar is coupled with a complementary hinge member fixed to the front portion of the spectacles.

\* \* \* \* \*

UNITED STATES PATENT AND TRADEMARK OFFICE
CERTIFICATE OF CORRECTION

PATENT NO.        : 8,651,659 B2                                              Page 1 of 1
APPLICATION NO.   : 13/496924
DATED             : February 18, 2014
INVENTOR(S)       : Patrizio Bertelli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 144 days.

Signed and Sealed this

Twenty-ninth Day of September, 2015

Michelle K. Lee
*Director of the United States Patent and Trademark Office*